US006919955B2

United States Patent
Shi et al.

(10) Patent No.: US 6,919,955 B2
(45) Date of Patent: Jul. 19, 2005

(54) LOW FORCE OPTICAL FIBER AUTO-ALIGNMENT SYSTEM

(75) Inventors: Ting Shi, San Jose, CA (US); Dallas Meyer, Danville, CA (US)

(73) Assignee: Finisar Corporation, Sunnyvale, CA (US)

( * ) Notice: Subject to any disclaimer, the term of this patent is extended or adjusted under 35 U.S.C. 154(b) by 245 days.

(21) Appl. No.: 10/150,386

(22) Filed: May 17, 2002

(65) Prior Publication Data

US 2003/0156279 A1 Aug. 21, 2003

Related U.S. Application Data

(60) Provisional application No. 60/358,840, filed on Feb. 20, 2002.

(51) Int. Cl.[7] .......................... G01B 11/26; G01B 11/00
(52) U.S. Cl. ........................ 356/153; 356/400; 356/399
(58) Field of Search ................................. 356/153, 399, 356/400; 385/88, 90

(56) References Cited

U.S. PATENT DOCUMENTS

| 4,301,409 A | | 11/1981 | Miller et al. |
|---|---|---|---|
| 4,345,148 A | | 8/1982 | Pines et al. |
| 4,609,291 A | | 9/1986 | Takahashi |
| 4,712,063 A | | 12/1987 | Osterwald et al. |
| 4,875,755 A | * | 10/1989 | Borgos et al. ................. 385/78 |
| 5,581,346 A | | 12/1996 | Sopori |
| 5,677,973 A | * | 10/1997 | Yuhara et al. ................. 385/90 |
| 6,137,105 A | | 10/2000 | Drobot et al. |
| 6,545,261 B1 | | 4/2003 | Blake et al. |
| 6,556,751 B1 | * | 4/2003 | Lee et al. ...................... 385/50 |
| 6,590,658 B2 | | 7/2003 | Case et al. |

OTHER PUBLICATIONS

Hickman II et al., "Uniformity and Performance Characterization of GaN P–I–N Photodetectors Fabricated From 3–Inch Epitaxy," MRS Internet J. Semicond. Res. 4S1, G7.6 (1999).

U.S. Appl. No. 10/150,417, filed May 17, 2002, Shi et al.

* cited by examiner

*Primary Examiner*—Layla Lauchman
(74) *Attorney, Agent, or Firm*—Workman Nydegger

(57) ABSTRACT

Various techniques are disclosed to align an optical fiber with a light source or a photo-detector using a low-force contact.

25 Claims, 4 Drawing Sheets

LOW FORCE OPTICAL FIBER AUTO-ALIGNMENT SYSTEM

CROSS-REFERENCE TO RELATED APPLICATION

This application claims priority from U.S. Provisional Application Serial No. 60/358,840, filed on Feb. 20, 2002.

TECHNICAL FIELD

This disclosure relates to alignment of optical fibers with light sources or photo-detectors.

BACKGROUND

Optical fibers may be used to carry light emitted from a source of light or to carry light to a photo-detector. As part of this transmission, the optical axis of the optical fiber may be aligned with a preferred location in relation to the light source or the photo-detector.

The preferred location may be found by moving the fiber with respect to the light source or the photo-detector and measuring a response of the photo-detector or, alternatively, the quality or quantity of the light coupled to the fiber.

In a "force-free alignment" the light source/fiber or photo-detector/fiber pairs are aligned without being in physical contact. A small gap is maintained between the fiber and the light source or the photo-detector. The fiber is scanned across the surface of the light source or the photo-detector until a preferred location is determined. The fiber is then secured in that location by, for example, bonding.

Greater structural integrity may be obtained when the fiber is in contact with the light source or photo-detector than when there is a gap between them. Also, when the parts are in contact there is less opportunity for misalignment and/or optical losses than when the light must traverse a gap between the parts.

However, frictional forces between the fiber and the light source or photo-detector may interfere with locating the fiber when the fiber is in contact with the light source or the photo-detector. One source of interference is introduced by system elastic deformation and metal surface finish resulting in a stick-slip motion that may hinder precise alignment. System elastic deformation includes the frictional forces introduced by contact between the fiber and the light source or the photo-detector.

BRIEF SUMMARY

A first implementation includes a method of aligning an optical fiber with a light source or a photo-detector by locating the optical fiber to a first position on the light source or photo-detector. The fiber is moved toward the light source or the photo-detector until they contact each other. An alignment value is measured. The fiber is separated from the light source or photo-detector and re-located to another position on the light source or photo-detector. The movement towards and contacting then measuring, separating and relocating continues until a predetermined number of measurements are taken. A preferred alignment location is determined from an analysis of the measurements. The fiber is moved to the preferred location, a preferred contact pressure is applied, and the fiber is secured in place.

A second implementation includes a method of aligning an optical fiber with a light source or a photo-detector by first determining a stick-slip force associated with a predetermined contact force between the optical fiber and the light source or photo-detector. The fiber is then moved to a first position on the light source or photo-detector. The predetermined contact force is applied between the fiber and the light source or photodetector and an alignment valued is measured. The fiber is re-located to another position on the light source or photo-detector at a distance remote enough from the first position to at least overcome the stick-slip force. A preferred alignment location is determined from an analysis of the measurements. The fiber is moved to the preferred location, a preferred contact pressure is applied, and the fiber is secured in place.

In a third implementation, the fiber and light source or photo-detector are optically aligned at a first distance between the parts. The fiber is moved to second distance from the light source or photo-detector and again optically aligned. From the distance and the orientation, the intersection point of the fiber optical axis with the light source or the photodetector optical axis is determined. The fiber is moved to the calculated intersection point. The fiber is moved in the Z-axis to achieve a predetermined contact pressure and secured in place.

A system for implementing the methods is also disclosed.

It is an advantage of some of the implementations that measurement of an alignment value is taken while the fiber is in contact with the light source or photo-detector. Some implementations have the advantage that the fiber is separated from the light source pr photo-detector while the fiber is moved. It is also an advantage of some implementations that the fiber is in contact with the light source or photo-detector when the fiber is secured. Other features and advantages will be readily apparent from the detailed description, figures and claims.

BRIEF DESCRIPTION OF DRAWINGS

Like reference symbols in the various drawings indicate like elements.

DETAILED DESCRIPTION OF THE INVENTION

Figure 1:
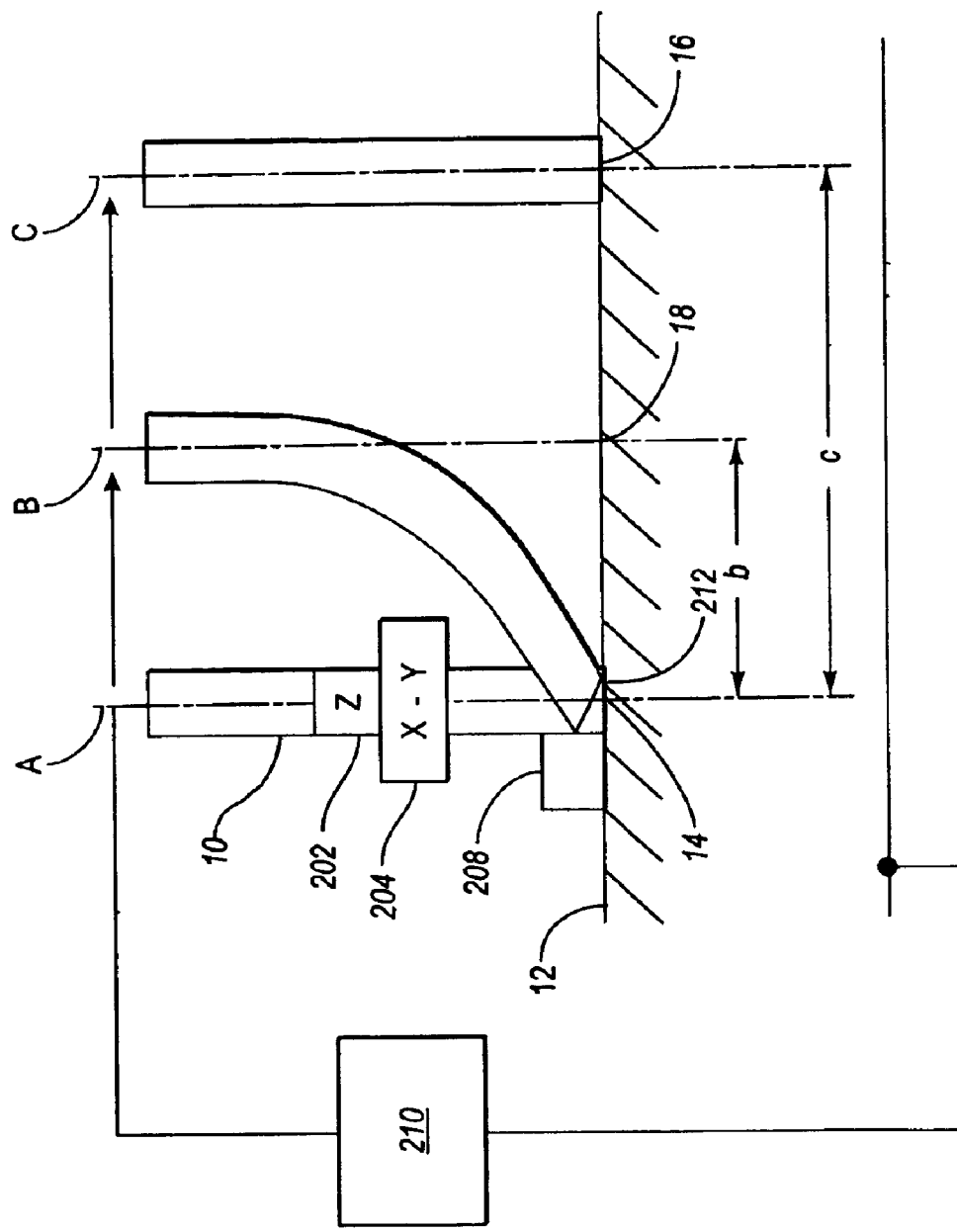
FIG. 1 is an illustration of the concept of stick-slip motion.

FIG. 1 illustrates the effect of stick-slip on the motion of a fiber 10 across the surface of a light source or photo-detector 12. The fiber may also include any associated ferrules or other holding device. The light source or photo-detector may also include any associated lens and/or metal housing. "Stick-slip" is a phenomena in which the fiber 10 at a location "A" sticks to the light source or the photo-detector 12 because of friction and sudden release when the fiber is moved to another location "B." The tension in the fiber builds because the fiber end in contact with the light source or the photo-detector at point 14 may not move immediately with the movement of the rest of the fiber. After sufficient motion of the fiber 10 to a location "C," for example, the tension reaches a critical level where the tension due to the bending of the fiber 10 exceeds the frictional forces between the fiber and the light source or photo-detector. The fiber then suddenly releases from the light source or the photo-detector and re-contacts at a point 16. "Stick-slip" motion is characterized by jittery movement of the fiber. The result is that locations such as 18 on the light source or the photo-detector between the initial and final positions can not be reached and measured for a preferred alignment position. Thus, locating the preferred location is limited by the stick-slip which may result in the fiber being located in a position other than the preferred location.

FIG. 1 illustrates an implementation of a low force alignment of an optical fiber with a light source or photo-detector. A XY-stage 204 for two-dimensional horizontal movement and a Z-stage 202 for vertical movement are associated with a fiber 200. The stages are capable of moving the fiber in a XYZ orthogonal coordinate system. A load cell 208 associated with the fiber is situated to detect and measure a force with which an end 212 of the fiber contacts another surface such as the surface of a light source or photo-detector 12. A current meter, oscilloscope or other measurement device 210 is coupled to the fiber and the light source or photo-detector and measures the output of the fiber 200 or photo-detector 206. The measuring device 210 may also be coupled to a memory system (not shown) for recording and/or manipulating the output results.

Movement of a fiber 10 can be achieved by moving the fiber a sufficient distance to overcome the stick-slip force described above. The Z-stage 202 and the load cell 208 move the fiber 10 to contact the light source or the photo-detector at a desired force at a location 14. An output measurement is taken and associated with the location. The XY-stage moves the fiber to a location "C." Distance "c" is chosen as that distance sufficient to overcome the stick-slip phenomena due to system elastic deformation under constant load and metal interface friction effects as described above. The XY movement step size is chosen so that the stick-slip effect is overcome and the XY-stage moves the fiber a substantially equal amount to location 16 on the surface of the light source or the photo-detector. The locations and associated measurements are recorded and the preferred location selected. The XY-stage then moves the fiber to the preferred location where the fiber may be affixed in position. Thus, the fiber is in contact with the light source or the photo-detector at the preferred location and at the desired force.

Figure 2:
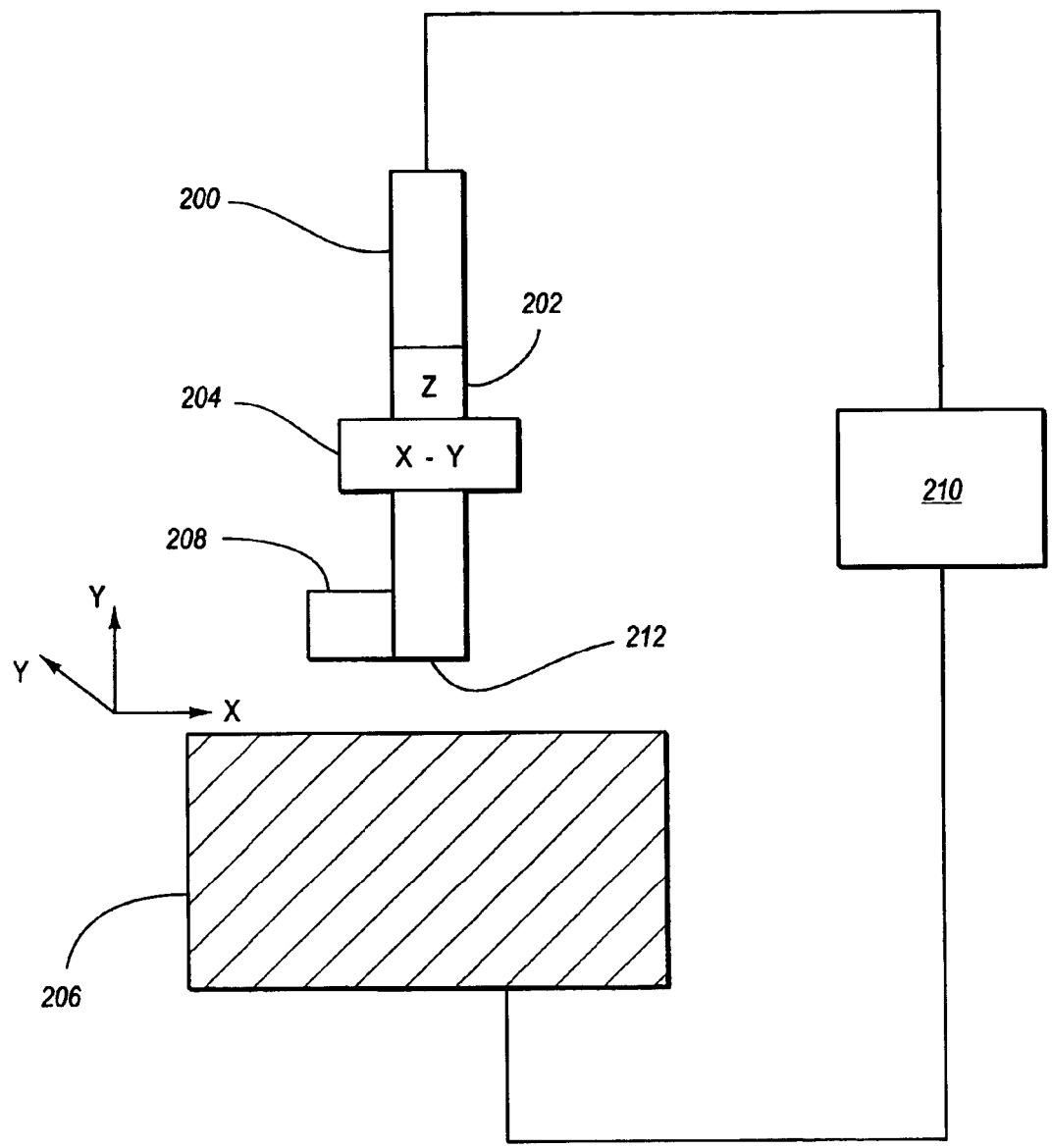
FIG. 2 is an illustration of an implementation of a low force alignment method.

FIG. 2 illustrates an alternative implementation of a low force alignment method for aligning an optical fiber at a preferred location with a light source or the photo-detector. A XY-stage 204 and a Z-stage 202 are associated with a fiber 200. The stages are capable of moving the fiber in a XYZ orthogonal coordinate system. A load cell 208 associated with the fiber is situated to detect and measure a force with which an end 212 of the fiber contacts another surface such as the surface of a light source or photo-detector 206. A current meter, oscilloscope or other measurement device 210 is coupled to the fiber and the light source or photo-detector and measures the output of the fiber 200 or photo-detector 206. The measuring device 210 may also be coupled to a memory system (not shown) for recording and/or manipulating the output results.

Figure 3:
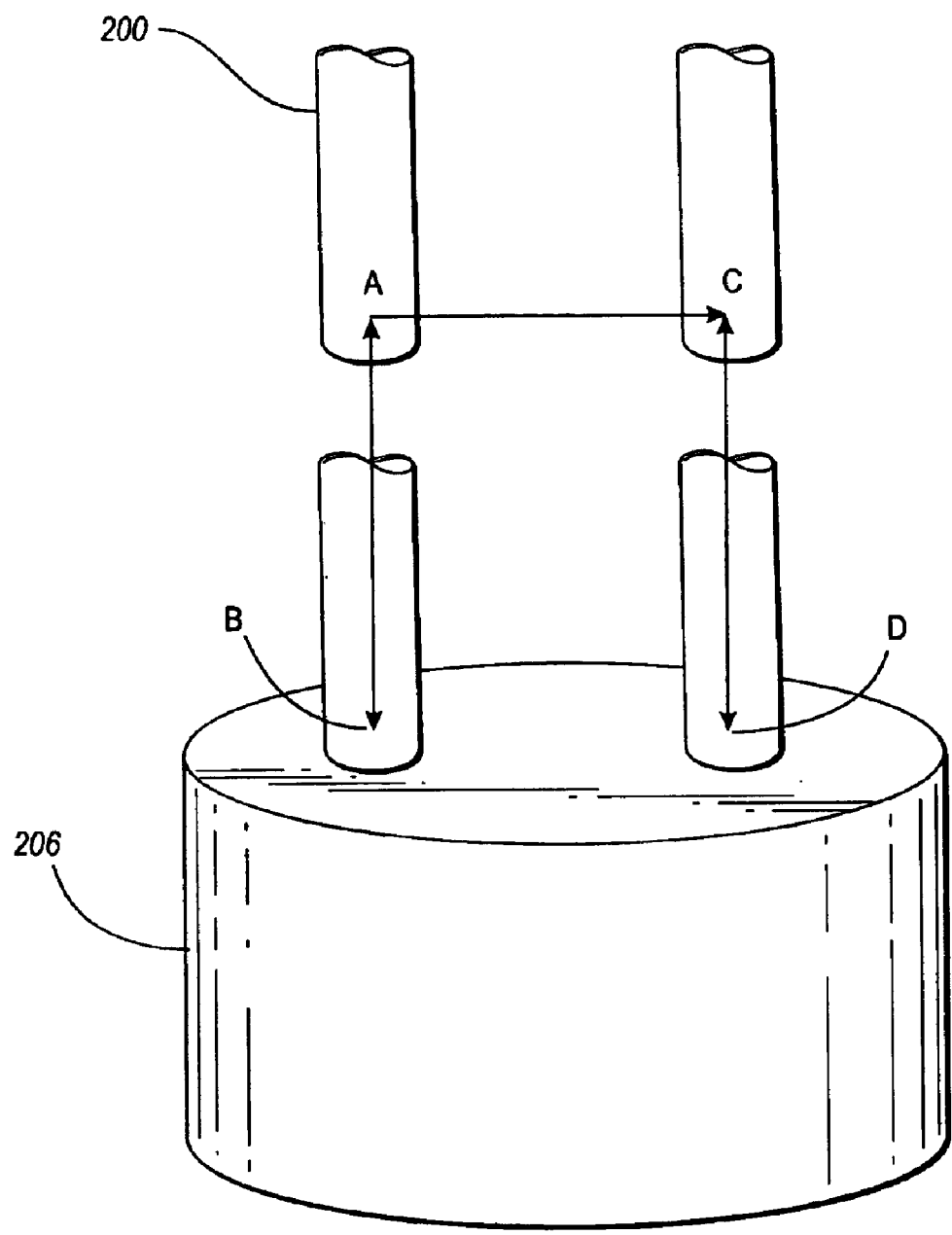
FIG. 3 is an illustration of the motion of the fiber with respect to the light source or the photo-detector of FIG. 2.

FIG. 3 illustrates the movement of the optical fiber 200 of FIG. 2 to locate the preferred alignment location. Fiber 200 starts at position "A" separated from the light source or the photo-detector 206. The Z-stage (not shown in FIG. 3) moves the fiber towards the light source or the photo-detector until the load cell (not shown in FIG. 3) detects contact with the light source or the photo-detector at a location "B". The Z-stage in coordination with the load cell moves the fiber so that there is a predetermined force between the fiber and the light source or the photo-detector. A measurement of the output of the photo-detector or fiber then is taken by the measurement device (not shown in FIG. 3) and associated with the location. Thus, the measurement is taken with the fiber in contact with the light source or the photo-detector at a desired contact force. The Z-stage then moves the fiber away from the light source or the photo-detector to location "A," for example.

Next, the XY-stage (not shown in FIG. 3) moves the fiber to a location "C." Since the fiber is not in contact with the light source or the photo-detector there is no stick-slip motion as was described above. The fiber may be moved to any location with respect to the light source or the photo-detector. As before, the Z-stage again moves the fiber to contact the light source or the photo-detector at a location "D." Another measurement is taken and associated with this second location. The Z-stage then moves the fiber away from the light source or the photo-detector to location "C," for example.

Measurements are associated with as many locations as desired. From an analysis of the measurements, a preferred location is selected. The XY-stage moves the fiber to that location. The Z-stage then moves the fiber to contact the light source or the photo-detector until the predetermined force detected by the load cell. The fiber may then be affixed in the preferred location by bonding, for example.

The foregoing description has the fiber moving and the light source or the photodetector stationary. However, the motion is relative and a similar result may be achieved by having a stationary fiber and moving the light source or photo-detector.

Figure 4:
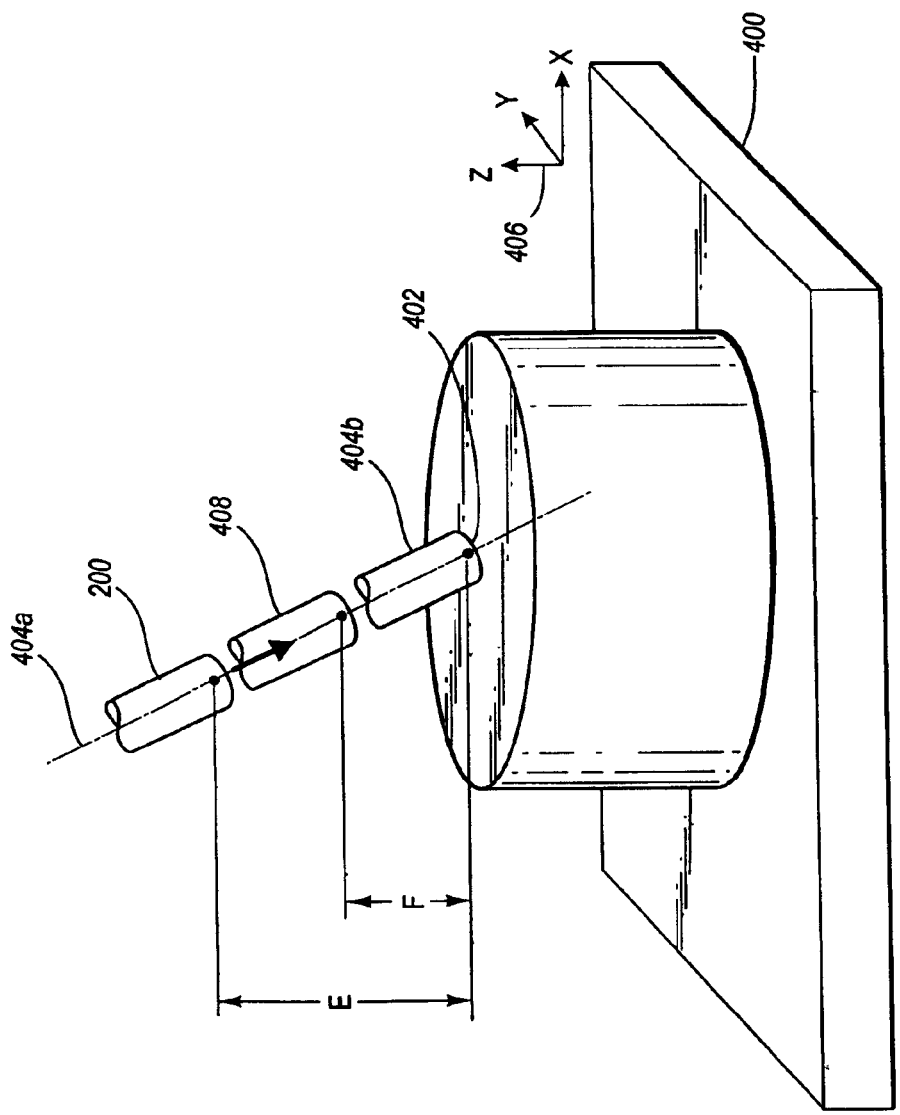
FIG. 4 is an illustration of an alternative implementation of the low force alignment method.

FIG. 4 illustrates another implementation of a low force alignment of an optical fiber with a light source or photo-detector. A light source or photo-detector 206 is held in a fixture 400. The light source or photo-detector 206 has an optical axis 404b. Fixture 400 establishes a frame of reference in the X, Y and Z orthogonal axes 406 for the fixture. Optical axis 404b need not be parallel to the frame of reference axis, the Z-axis, for example, in FIG. 4. An optical fiber 200 is located, initially, at a distance "E" from the light source or the photo-detector and has an optical axis 404a. A XY-stage (not shown in FIG. 4) moves fiber 200 so that fiber optical axis 404a is aligned with light source or photodetector optical axis 404b. A Z-stage (not shown in FIG. 4) moves the fiber 200 to a distance "F" from the surface of the light source or photo-detector. The XY-stage again moves fiber 200 so that the fiber optical axis 404a is aligned with the optical axis 404b. The angular orientation of the optical axis 404a with respect to the coordinate system can then be determined from the change in the X-Y coordinates and the change in distance from "E" to "F" in any manner known to those of ordinary skill in the art. From the orientation determined and the distance "F," an intersection point 402 of optical axis 404a and the surface of the light source or the photo-detector 206 can be determined through ordinary geometry.

As an example, assume the fiber optical axis 404a is aligned with the light source or photo-detector optical axis 404b at a distance "E" of 3 microns. The Z-stage then moves the fiber to a distance "F" of 2 microns from the light source or photo-detector. The XY-stage again aligns the optical axes 404a and 404b.

The XY-stage and the Z-stage may be used to move fiber 200 along optical axis 404a in a direction indicated by arrow 408 until a load cell (not shown in FIG. 4) detects contact, at the desired force, with the light source or the photodetector at the intersection point 402. The Z-stage in coordination with the load cell maintains the desired contact force. The fiber can be aligned and in contact with the light source or the photo-detector at a preferred contact force avoiding the stick-slip motion accompanying movement of the fiber while in contact with the light source or the photo-detector.

Other implementations are within the scope of the following claims.

What is claimed is:

1. A method of aligning an optical fiber with a light source or a photo-detector comprising:
   measuring an optical alignment value at a first location with the fiber and light source or photo-detector in contact;
   moving the fiber to a second location with the fiber and light source or photo-detector separated; and
   measuring a second alignment value at the second location with the fiber and light source or photo-detector separated.

2. A method of aligning an optical fiber with a light source or a photo-detector comprising:
   locating the optical fiber at a first position near the light source or photo-detector;
   moving the fiber towards the light source or the photo-detector;
   detecting contact of the fiber with the light source or the photo-detector;
   measuring an optical alignment value;
   separating the fiber from the light source or photo-detector;
   re-locating the fiber to another position near the light source or photo-detector;
   repeating the moving towards, detecting, measuring, separating and relocating until a predetermined number of measurements are taken; and
   subsequently moving the fiber to an alignment location based on the measurements.

3. The method of claim 2 wherein the detecting further comprises applying a predetermined contact force between the fiber and the light source or photo-detector prior to measuring the optical alignment value.

4. The method of claim 2 further comprising recording the measured optical alignment values.

5. The method of claim 3 further comprising applying the predetermined contact force between the fiber and the light source or photo-detector at the alignment location.

6. The method of claim 5 further comprising securing the fiber to the light source or photo-detector at the alignment location.

7. A method of aligning an optical fiber with a light source or a photo-detector comprising:
   determining a stick-slip force for a predetermined contact force between the optical fiber and the light source or photo-detector;
   locating the fiber at a first position on the light source or photo-detector;
   applying the predetermined contact force between the fiber and the light source or photo-detector;
   measuring an optical alignment value; and
   re-locating the fiber to a second position on the light source or photo-detector, the second position remote enough from the first position to at least overcome the stick-slip force.

8. The method of claim 7 further comprising:
   repeating the measuring and relocating until a predetermined number of measurements are taken; and
   subsequently moving the fiber to a alignment location based on the measurements.

9. The method of claim 8 further comprising recording the measured optical alignment values.

10. The method of claim 9 further comprising applying the predetermined contact force between the fiber and the light source or photo-detector at the alignment location.

11. The method of claim 10 further comprising securing the fiber to the light source or photo-detector at the alignment location.

12. A method of aligning an optical fiber with a light source or a photo-detector comprising:
    locating the optical fiber a first distance from the light source or photo-detector;
    aligning an optical axis of the optical fiber with an optical axis of the light source or photo-detector;
    re-locating the fiber to a second distance from the light source or photo-detector;
    re-aligning the optical axis of the optical fiber with the optical axis of the light source or photo-detector; and
    calculating an intersection point of the fiber on the light source or photo-detector wherein the optical axes are aligned.

13. The method of claim 12 further comprising moving the fiber to the intersection point.

14. The method of claim 13 further comprising applying a predetermined contact force between the fiber and the light source or photo-detector.

15. The method of claim 14 further comprising securing the fiber to the light source or photo-detector.

16. A system for aligning an optical fiber with a light source comprising:
    an X-Y stage coupled to the optical fiber to locate the fiber with respect to a position of the light source;
    a Z-stage coupled to the fiber to move the fiber toward or away from the light source;
    a load detector coupled between the fiber and the light source to sense a contact force of the fiber with the light source; and
    a device positioned to measure an output of the fiber when the fiber is in contact with the light source.

17. The system of claim 16 further comprising circuitry to associate a measured output with a location of the fiber with respect to a position of the light source or photo-detector.

18. The system of claim 17 further comprising a memory to record the measured output and the associated location of the fiber.

19. The system of claim 18, wherein the circuitry is to select an alignment location.

20. The system of claim 19 wherein the circuitry includes a processor.

21. A system for aligning an optical fiber with a photo-detector comprising:
    a light source coupled to the optical fiber;
    an X-Y stage coupled to the optical fiber to locate the fiber with respect to a position of the photo-detector;
    a Z-stage coupled to the fiber to move the fiber toward or away from the light source or photo-detector;
    a load detector coupled between the fiber and the photo-detector to sense a contact force of the fiber with the photo-detector; and
    a device positioned to measure an output of the photo-detector when the fiber is in contact with the photo-detector.

22. The system of claim 21 further comprising circuitry to associate a measured output with a location of the fiber with respect to a position photo-detector.

23. The system of claim 22 further comprising a memory to record the measured output and the associated location of the fiber.

24. The system of claim 23 wherein the circuitry is to select an alignment location.

25. The system of claim 24 wherein the circuitry includes a processor.

* * * * *